US007805472B2

(12) United States Patent
DeBie (10) Patent No.: US 7,805,472 B2
(45) Date of Patent: Sep. 28, 2010

(54) APPLYING MULTIPLE DISPOSITION SCHEDULES TO DOCUMENTS

(75) Inventor: Tod DeBie, Costa Mesa, CA (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 11/615,816

(22) Filed: Dec. 22, 2006

(65) Prior Publication Data

US 2008/0154969 A1    Jun. 26, 2008

(51) Int. Cl.
*G06F 12/00* (2006.01)
*G06F 17/30* (2006.01)
(52) U.S. Cl. ..................... 707/829; 707/999.2
(58) Field of Classification Search .......... 707/200, 707/829, 999.2
See application file for complete search history.

(56) References Cited

U.S. PATENT DOCUMENTS

| | | | |
|---|---|---|---|
| 5,276,901 A | 1/1994 | Howell et al. | |
| 5,410,667 A | 4/1995 | Belsan et al. | |
| 5,692,178 A | 11/1997 | Shaughnessy | |
| 5,701,458 A | 12/1997 | Bsaibes et al. | |
| 5,813,009 A | 9/1998 | Johnson et al. | |
| 5,892,900 A | 4/1999 | Ginter et al. | |
| 5,917,912 A | 6/1999 | Ginter et al. | |
| 5,921,582 A | 7/1999 | Gusack | |
| 6,134,552 A | 10/2000 | Fritz et al. | |
| 6,208,993 B1 | 3/2001 | Shadmon | |
| 6,236,994 B1 | 5/2001 | Swartz et al. | |
| 6,480,851 B1 | 11/2002 | Terek | |
| 6,519,571 B1 | 2/2003 | Guheen et al. | |
| 6,553,365 B1 * | 4/2003 | Summerlin et al. ............ 707/2 |
| 7,233,959 B2 * | 6/2007 | Kanellos et al. .......... 707/104.1 |
| 7,478,088 B2 * | 1/2009 | Summerlin et al. ............ 707/5 |
| 7,594,082 B1 * | 9/2009 | Kilday et al. ............... 711/154 |
| 2002/0111960 A1 | 8/2002 | Irons et al. | |
| 2002/0161602 A1 | 10/2002 | Dougherty et al. | |
| 2003/0041198 A1 | 2/2003 | Exton et al. | |
| 2003/0088784 A1 | 5/2003 | Ginter et al. | |
| 2003/0130993 A1 | 7/2003 | Mendelevitch et al. | |
| 2003/0195866 A1 | 10/2003 | Long et al. | |
| 2003/0200234 A1 | 10/2003 | Koppich et al. | |
| 2003/0227487 A1 | 12/2003 | Hugh | |
| 2003/0229623 A1 | 12/2003 | Chang et al. | |

(Continued)

OTHER PUBLICATIONS

U.S. Appl. No. 11/317,712, filed Dec. 23, 2005, entitled "Dynamic Holds of Record Dispositions During Record Management", invented by T. DeBie.

(Continued)

*Primary Examiner*—John E Breene
*Assistant Examiner*—Joshua Bullock
(74) *Attorney, Agent, or Firm*—David Victor; Konrad Raynes & Victor LLP (57) ABSTRACT

Provided are a method, system, and article of manufacture for applying multiple disposition schedules to documents. A file plan includes a plurality of containers, wherein each container is capable of providing management information for documents. A plurality of disposition schedules are defined, wherein each disposition schedule provides rules to use to determine documents in the file plan to dispose. At least two of the plurality of disposition schedules in the file plan are applied to one document in the file plan to determine whether to dispose of the document.

26 Claims, 4 Drawing Sheets

U.S. PATENT DOCUMENTS

| | | |
|---|---|---|
| 2004/0225730 A1 | 11/2004 | Brown et al. |
| 2005/0102297 A1 | 5/2005 | Lloyd et al. |
| 2005/0165734 A1* | 7/2005 | Vicars et al. ............... 707/2 |
| 2005/0171914 A1 | 8/2005 | Saitoh |
| 2005/0216467 A1 | 9/2005 | Urakawa et al. |
| 2005/0216524 A1 | 9/2005 | Gomes et al. |
| 2005/0262132 A1 | 11/2005 | Morita et al. |
| 2006/0085245 A1 | 4/2006 | Takatsuka et al. |
| 2006/0085374 A1* | 4/2006 | Mayes et al. ............... 707/1 |
| 2006/0101019 A1 | 5/2006 | Nelson et al. |
| 2006/0149735 A1 | 7/2006 | DeBie et al. |
| 2006/0173932 A1 | 8/2006 | Cortright et al. |
| 2006/0230044 A1* | 10/2006 | Utiger ............... 707/10 |
| 2006/0288050 A1 | 12/2006 | Wilson |
| 2007/0005595 A1 | 1/2007 | Gafter |
| 2007/0033191 A1 | 2/2007 | Hornkvist et al. |
| 2007/0088585 A1 | 4/2007 | Maguire |
| 2007/0088736 A1 | 4/2007 | DeBie |
| 2007/0130165 A1 | 6/2007 | Sjoblom et al. |
| 2007/0136397 A1 | 6/2007 | Pragada et al. |
| 2007/0220001 A1 | 9/2007 | Faden |
| 2007/0226320 A1 | 9/2007 | Hager et al. |
| 2007/0244899 A1 | 10/2007 | Faitelson et al. |
| 2008/0022361 A1 | 1/2008 | Bharadwaj et al. |
| 2009/0055397 A1 | 2/2009 | Man et al. |
| 2009/0077087 A1 | 3/2009 | Urano et al. |

OTHER PUBLICATIONS

U.S. Appl. No. 11/401,994, filed Apr. 11, 2006, entitled "Managing Content Objects Having Multiple Applicable Retention Periods", invented by T. DeBie.

US Patent Application, filed Dec. 22, 2006, entitled "Using An Access Control List Rule to Generate An Access Control List for A Document Included in a File Plan", invented by T. DeBie.

US Patent Application, filed Dec. 22, 2006, entitled "File Plan Import and Sync Over Multiple Systems", invented by T. DeBie.

US Patent Application, filed Dec. 22, 2006, entitled Physical to Electronic Record Content Management, invented by T. DeBie.

* cited by examiner

Container Information

FIG. 5

APPLYING MULTIPLE DISPOSITION SCHEDULES TO DOCUMENTS

BACKGROUND OF THE INVENTION

1. Field of the Invention

The present invention relates to a method, system, and program for applying multiple disposition schedules to documents.

2. Description of the Related Art

Enterprise content management systems facilitate managing a variety of information/content (documents) and processes that use such information during the course of enterprise operations. Documents, as used herein, refer to any identifiable logical/physical units of information, including content and transactions generated by the enterprise. A document may comprise an electronic file, object, program, database, image, email, message, etc. or a physical item, such as a paper, file, cassette recording, model, storage device having content, etc. Documents stored in the content management system may not initially be managed as part of a records management system until they go through a "declaration" procedure that creates a corresponding record information object (RIO) for the document. Each RIO may include metadata and a reference to the declared document. The metadata describes/characterizes the declared document. The reference is, for example, a location of the document maintained in an electronic file system or database maintained in a computer-readable media. Alternatively, in the case of a physical document, the reference specifies a physical document location (e.g., a box number, a file cabinet, etc.) where the document is located. Once declared as a record, a document is managed/accessed via the content management system and access to the declared document takes place via the content management system.

Other embodiments may not use the RIO/reference model and may instead directly attach record information or metadata to the document or object itself or use other means to track and/or manage records.

The scope of content represented by RIOs is not limited to any particular type of document form or location. A variety of document types are potentially referenced by the RIOs of the records manager. Such document types include, by way of example: formal documents such as permits, invoices, tax records, patents, contracts, claims, manuals etc; informal documents such as email messages (and attachments), text messages, meeting notes, etc.; multimedia content such as audio, video files; and physical containers such as file boxes, cabinets, folders, etc. The documents referenced by the RIOs are potentially stored in a variety of forms and locations. For example, electronic documents including images, text files, forms, etc. are potentially stored in file systems and databases. Physical documents referenced by RIOs are potentially stored in cabinets, boxes, file folders, etc.

After declaring a document, the associated RIO is maintained in an electronic object storage facility referred to as a "file plan object store" including one or more "file plans". In certain cases, file plans for documents may be maintained without a file plan object store. Each file plan comprises an outline/definition for record management based upon a hierarchically arranged set of categories (classes/subclasses) and containers for classifying/organizing/maintaining the RIOs and their associated declared documents. A known file plan arrangement for storing records includes the following containers: categories/sub-categories, record folders, and record volumes. In addition to defining a taxonomy of document types declared within the system, the file plan supports specifying management rules for RIOs placed within particular document categories and sub-categories. Such rules include user role-based access/permissions to RIOs and their associated documents, and defining disposition schedules specifying when particular disposition actions (e.g., transfer, review, destroy, archive, etc.) are to be taken with respect to documents declared under the category. Thus, the known file plan structure can be visualized as a hierarchical tree structure where nodes potentially specify distinct containers (e.g., category or container of categories). Each category within the file plan potentially specifies a set of properties and lifetime document management rules for associated document records.

The file plan supports multiple ways of associating disposition schedules with RIOs. A disposition schedule may be associated with a record category/sub-category, a record folder, or a record type. Thus, a record folder including RIOs can have a disposition schedule. Alternatively, in cases where a disposition schedule is not assigned to a record folder including the RIOs, the record folder inherits a disposition schedule associated with a parent record category/sub-category. Finally, a disposition schedule is potentially associated with a particular record type.

A disposition schedule may be provided for a record by associating the disposition schedule directly with the RIO for the record. Further, a document inherits the disposition schedule associated with the record folder under which the RIO for the document is declared. In cases where disposition schedules are specified at both category and folder levels, the disposition schedule associated with the container including the RIO or closest ancestor container to container including the RIO is applied.

Furthermore, as noted above, a disposition schedule is potentially associated with a record type. Therefore, the default disposition schedule for a RIO (based upon the RIO's position in the file plan hierarchy) is overridden by defining a new record type, associating an overriding disposition schedule with the new record type, and assigning the new record type to the RIO. Thus, when different disposition schedules are associated with the record category, record folder, and record type associated with a RIO, then the RIO adopts the overriding disposition schedule from the record type. Alternatively, the disposition schedule may be associated or applied directly to the document or object, without using an intermediate RIO or file plan.

A disposition schedule seeks to effectively manage the disposition of documents in an enterprise. For example, with regard to scheduled document destruction, maintaining documents beyond their specified/intended lifespan potentially consumes limited resources (e.g., warehouse shelf space, office cabinets/drawers, etc.). Failure to remove records can also degrade the performance of the system itself due to the need to actively check/track record objects within file plans until their corresponding documents are destroyed. However, destroying documents before the end of their intended lifespan can result in penalties/fines for violations of government guidelines/regulations or damages for breaches of contractual obligations.

Records management applications may be integrated with the enterprise content management systems to define and apply disposition schedules to declared documents. The records manager may include an interface for defining a file plan taxonomy including declared document record types/containers and associated schedules/rules. Furthermore, the records manager supports declaring documents in the system and appending their corresponding RIOs to an appropriate hierarchical node of a file plan (thereby associating a particular file plan-based disposition schedule with the RIO). Thereafter the records manager invokes methods/operations supported by an interface provided by the content engine to perform a "sweep" operation that traverses the file plan and applies corresponding disposition schedules defined for corresponding categories/sub-categories within the file plan.

The disposition schedules created and applied by the records manager define retention rules for declared documents (represented by RIOs in the file plan) and instructions for disposing the declared documents when a retention period ends. The various potential disposition actions specified by the instructions include: review, transfer to archive (for permanent preservation), export to another location, and destruction. Each of the various disposition actions is a potential phase of a declared document's lifespan, and each phase includes a specified retention rule/period and an action to be performed when the retention period ends. A retention period can be extended by designating a hold on a RIO.

Disposition schedules (including periods and actions) are defined by any of a number of supported disposition schedule parameter types defining control of retention of RIOs. A disposition schedule potentially comprises multiple, sequential or concurrent disposition phases that are defined to retain RIOs in a particular state for a defined time period. The following parameters are potentially used to define a phase in a disposition schedule assigned to a particular category/sub-category container of a file plan—and the RIOs contained therein. An "event" specifies a trigger for commencement of a cutoff for contained/referenced record entities. A "cutoff" comprises closing entities at a specified interval to commence disposition actions on the entities. Thus, cutoff is used, for example, to end active use of a record. An "offset" specifies a time gap between registering an event and launching an associated cutoff action. A "cutoff action" specifies a disposition action performed automatically on an entity once a cutoff is triggered by an event and/or any specified offset period has expired. A "phase disposition instruction/action" parameter specifies a manually initiated action that is to be performed upon completion of a phase. Examples of disposition instructions/actions are review, transfer to archive (for permanent preservation), export, and destroy. Furthermore, each disposition instruction/action is associated with a workflow. When the disposition action is initiated, the system launches the workflow comprising a set of instructions to be executed upon an affected record.

The records manager may be used to define applicable dispositions that are mutually exclusive even though no more than one disposition schedule is actively applied to a particular RIO instance within a file plan. The active disposition schedule for any particular RIO in a file plan is determined according to the above-described precedence scheme. Furthermore, only one triggering event/offset combination can be specified within any particular phase of a disposition schedule assigned to a record type or node (e.g., category, folder, etc.) of a file plan. Thus, if a phase disposition instruction/action (e.g., document destruction) is not to be performed until completion of multiple events, then multiple RIOs (stored at multiple locations in one or more file plans) and multiple disposition schedules are created to handle the set of potentially controlling sequences of events.

There is a need in the art for improved techniques for applying disposition schedules within a file plan.

SUMMARY

Provided are a method, system, and article of manufacture for applying multiple disposition schedules to documents. A file plan includes a plurality of containers, wherein each container is capable of providing management information for documents. A plurality of disposition schedules are defined, wherein each disposition schedule provides rules for use to determine documents in the file plan to dispose. At least two of the plurality of disposition schedules in the file plan are applied to one document in the file plan to determine whether to dispose of the document.

DETAILED DESCRIPTION

Figure 1:
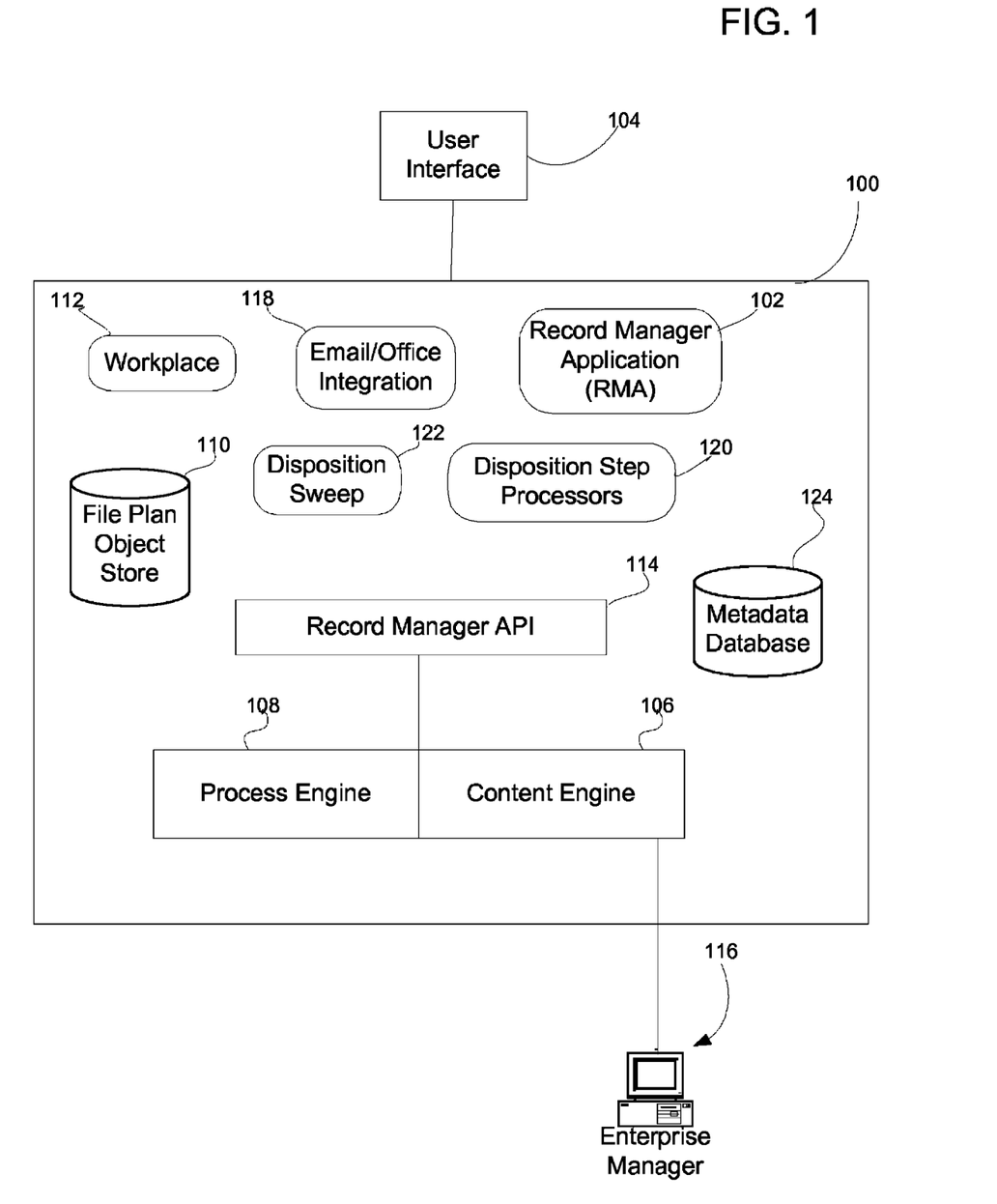
FIG. 1 illustrates of an embodiment of a computing environment.

FIG. 1 illustrates an embodiment of a record management system. The record management components execute on a server 100, such as a content server application platform 100, providing a user interface (e.g., Web server) to a variety of content management services via a set of hosted applications. The server 100 comprises an application platform including a collection of components that support records management functionality, including a records manager application 102, The records manager application 102 (RMA) 102 provides an interface for creating file plans and associated sub-component containers including: categories, sub-categories, record folders, etc. The RMA 102 also processes user commands submitted via a user interface 104 (e.g., a web browser) that may run on a connected client system or the server 100 to enable a user to create and manage record information objects (RIOs) stored within the created file plans. In one embodiment, the RMA 102 does not directly manage documents associated with RIOs. Instead, the RMA 102 manages/administers the previous declared documents via calls to a content engine 106 and a process engine 108. The content engine 106 stores classes, properties and event subscriptions that define records management related data.

Figure 2:
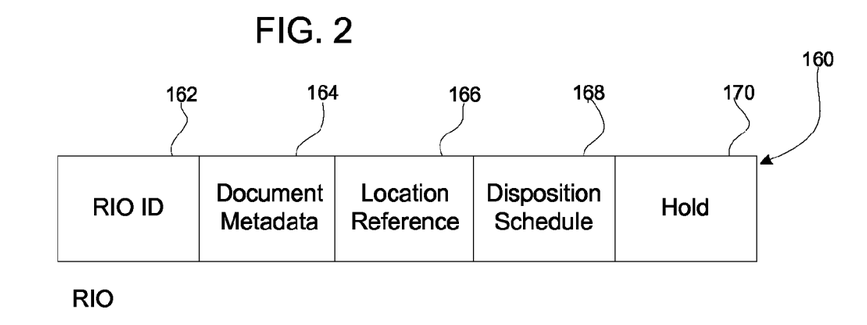
FIG. 2 illustrates an embodiment of information for a record information object.

During a declaration stage, an RIO is created for a new document, and the RIO is stored in a file plan object store 110 (see, FIG. 2). Declaring a new RIO is performed either manually or through automated processes that categorize a newly added electronic document based upon characteristics associated with the electronic document. In a workflow process, reaching a predefined point in a workflow may trigger an automatic declaration of a document being processed in the workflow. In the case of automatic declaration of a document, processes automatically analyze the document when it is saved/filed/submitted to the content engine 106. Such analysis involves extraction of, for example, a file system location, file metadata, content within the stored document (e.g., fields within an electronic form), etc. Upon detecting a particular event (e.g., detection of an event and/or expiration of a time period), the RMA 102 initiates actions for disposing (e.g., transfer, review, destroy, archive, etc.) of the document, but not necessarily the corresponding RIO representing the document, from the system.

In one embodiment, the RMA 102 is provided as an "Advanced Author" tool invoked via a workplace application 112 that provides Web access to the functionality of the enterprise content management application. The RMA 102 includes a file plan editor functionality that facilitates defining a hierarchically arranged set (taxonomy) of containers within which RIOs (and their associated declared documents) are stored. RMA 102 further enables the administrator to define one or more disposition schedules for each container (node) defined for a particular file plan.

The RMA 102 enables a user (e.g., a human records manager) via the user interface 104 to create and manage classification schemes (file plans) hierarchically arranging a set of RIOs corresponding to declared documents; create and manage disposition schedules (including potentially assigning multiple disposition schedules to a single container node—e.g., a category, a sub-category, a folder—in a file plan's hierarchy); create and manage the record folders (and folder volumes) that are created under parent container nodes of the file plan; configure the system to specify content engine 106 object classes and properties to manage; create RIOs for managing physical boxes, folders and records; search for categories, folders and records within the file plan hierarchical tree structure; and run pre-defined searches against content engine 106 objects and audit information to generate reports.

In addition to records managers, privileged end users can use RMA 102 to perform tasks such as creating record folders and declaring paper records. In addition, the RMA 102 may be configured with preferences specified under the workplace 112 and leverages the workplace 112 user preference model where applicable. In one embodiment the RMA 102 leverages a records management application program interface (API) 114 providing utilities that support records management functionality. An enterprise manager application 116, which may reside on a separate enterprise manager system or on the server 100, provides an administration tool for managing and creating file plan object stores, defining security, and enabling auditing. The enterprise manager application 116 may enable the following functions: creating object stores and manage services; creating and managing object classes and setting security defaults; configuring auditing; customizing the system to enforce behavior that is customer specific (e.g., customizing events related to records management).

The workplace 112, in addition to providing an entry point into the RMA application 102, provides an interface that end-users and records managers use to capture documents and declare RIOs; declare existing documents as RIOs; participate in record disposition processes via a "tasks" user interface; search for particular RIOs and print search results to generate basic reports; save user favorites (preferences) to aid in classification; and view record content.

Advanced users, records managers and integrators use the "advanced" tools of the workplace 112 such as the process designer and entry template designer to perform the following functions: create document information entry templates that include steps to automate the declaration process; create and modify workflow definitions that define the disposition review process, provide custom disposition actions, and integrate record capture and declaration capability in custom processes; and create custom searches and publishing templates.

An email/office software integration application 118 facilitates declaring mail and other office application documents to be managed in the file plan. Additional functionality provided for records management includes the automated capture of email transmission data as well as support for capturing attachments as separate documents that are linked to the message body.

The content engine 106 provides the repository services for storing file plans and records and is responsible for enforcing security and auditing. The content engine 106 includes a set of application program interfaces that support administering declared/registered documents within the system. The interfaces of the content engine 106 are called by a variety of applications/components of the content management server application platform 100 to implement a variety of functions/services including, in addition to the aforementioned disposition actions, the following: object repository, content storage, content retrieval, version management, relation management, security, content classification, event notifications/subscriptions, document lifecycle management, content searches, etc.

The process engine 108 provides workflow services that support records disposition processes/actions. The actions include process execution, process routing, rules management, process simulation and modeling, and workflow analysis. The process engine 108 may invoke one or more disposition sweeps 122, which represent a set of periodic/scheduled processes that wake up and perform a scan on the set of RIOs in a file plan, calculate record disposition action schedules, and collect a set of responsive RIOs for which disposition actions are presently due for presentation to a user for carrying out the associated disposition actions on the identified records. A set of disposition step processors 120 provides user interfaces for reviewing record dispositions. The disposition step processors 120 may be invoked via the workplace 112.

The server 100 may further include a metadata database 124 having metadata for documents declared in the file plan. In one embodiment, the metadata database 124 may store the RIOs.

FIG. 2 illustrates an embodiment of information included in an RIO 160, including an RIO identifier 162; document metadata 164 providing information on the document represented by the RIO, such as the document type, attributes of the document, and document content; a location reference 166 indicating the location of the document or object represented by the RIO; a disposition schedule 168 indicating an RIO level schedule for disposing of the document represented by the RIO; and a hold 170 comprising an RIO level hold to override any attempt to dispose of the document represented by the RIO. The RIO level disposition schedule 168 and hold 170 are optional, and may not be provided. The document referenced by the location reference 166 may comprise an electronic document, program or object. In such case, the location reference 166 provides the logical address that may be used to access the represented document. Alternatively, the document referenced by the location reference 166 may comprise a physical item. In such case, the location reference 166 indicates a physical location, such as floor, building, shelf, box, etc.

For instance, the RIO may represent documents comprising word processor documents, email messages, and graphics files; physical records, such as paper records, videotapes, portable storage media; vital records required for meeting operational responsibilities during an enterprise-wide emergency; permanent records identified as having sufficient historical or other value to warrant continued preservation by the organization beyond the time it is normally required for administrative, legal, or fiscal purposes.

Figure 3:
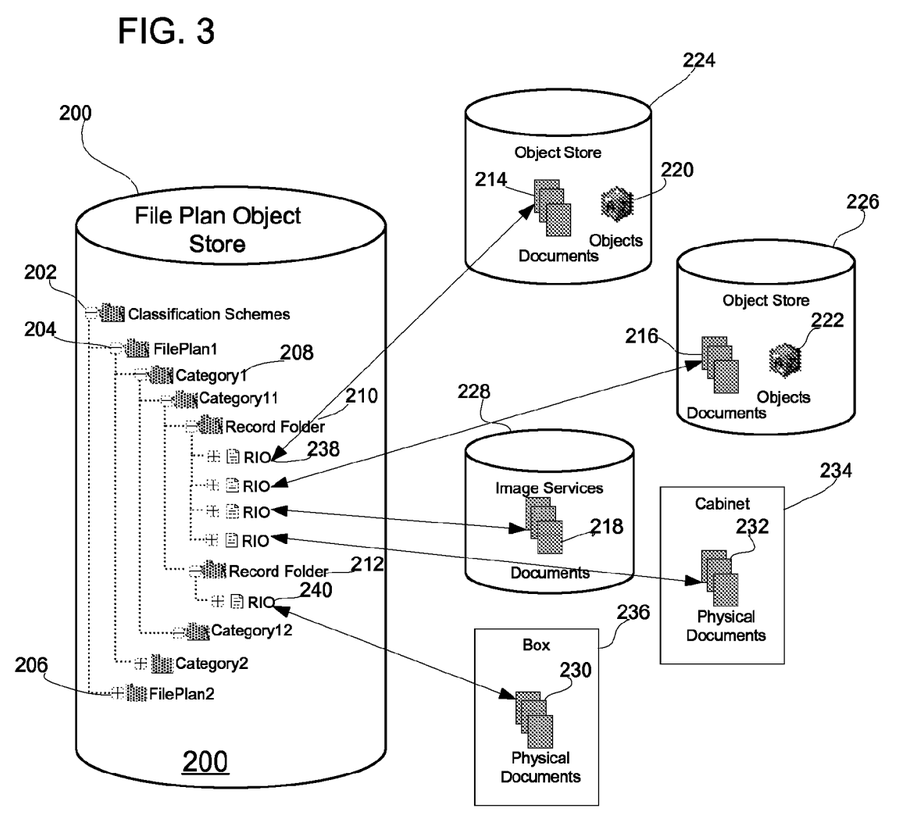
FIG. 3 illustrates an embodiment of a file plan object store.

FIG. 3 illustrates an embodiment of a file plan object store 200 comprising hierarchically arranged containers, where each container in the hierarchy may include other descendent containers, e.g., file plans, folders, record folders, categories, etc., and RIOs. The hierarchical arrangement of containers in file plans 204 and 206 may be implemented in the directories of a hierarchical file system, where each container comprises a folder in a directory, sharing a root node, such as the classification schemes 202. In one embodiment, the highest level node in the file plan object store 200 comprises a classification scheme node 202. At a next level, a set of file plans 204, 206 are each assigned to separate nodes. Each file plan defines an organization of records. Each file plan 204, 206 (e.g., FilePlan 1) defines a hierarchy for storing RIOs such that their context is preserved. For example, in one embodiment a file plan hierarchy may reflect business functions of an enterprise. A record category (e.g., Category1 208) provides a first level of organization of RIOs under a file plan node of the exemplary hierarchical document record organization structure. Record categories are created to classify records based on functional categories. Examples of typical descriptive categories within a business enterprise are "Human Resources", "Accounting", "R&D", "Legal", "Marketing", etc. The record categories potentially contain either a sub-category container (e.g., Category 11, Category 12) or a record folder container. Sub-category containers hold other sub-categories or record folders. Record folders contain actual RIOs 160.

A record folder 210, 212 serves as a container/collection of related RIOs. Record folders are used to manage RIOs according to retention periods, disposition events, and holds specified by their associated containers. The RIOs location references 166 (FIG. 2) may reference electronic documents 214, 216, 218 and objects 220, 222 (e.g., databases, programs, etc.) stored in electronic storage media in object stores 224, 226 or image services 228. RIOs may also reference physical documents or items 230, 232 stored in a physical location, such as a cabinet 234 or box 236. Examples of physical documents stored in boxes 236 and cabinets 234 include large building plans, storage device, books, hard copies, etc. The cabinet 234 and box 236 constructs provide mechanisms to model physical entities that contain other physical entities. For example, a "warehouse" contains "shelves" that contain "boxes" that contain the aforementioned physical folders. A box construct may contain another box, a physical folder, or a record. Hybrid folders are used as containers for a collection of related electronic and physical records.

The RIO nodes, e.g., 238, 240, in the file plan 200 reference and represent RIOs 160. The RIO nodes 238, 240 may comprise the RIO 160 itself or a reference to an RIO object in the metadata database 124 or other location. An RIO may inherit file management rules (e.g., disposition schedules and holds) from the immediate record folder 210, 212 in which it is included.

In one embodiment, when the document is declared in the file plan and assigned to a container, the RIO, e.g., 238 in the container may comprise a pointer or identifier, e.g., record identifier, to an RIO database object in the metadata database 124. The RIO record in the database 124 may include a pointer to another row in the database 124 including the RIO information, such as the document metadata 164, location reference 166, disposition schedule 168, and hold 170. In an alternative embodiment, the RIO database record addressed in the container, e.g., 210, may include all the RIO information 160. In an alternative embodiment, when declaring the document into a file plan, the document itself may be added to the container to which it is assigned, where the hierarchical file plan is implemented in a file system directory with the containers as folders. In such embodiments, the metadata database 124 may store the metadata for a document in the container that may be accessed using a document identifier, such as the document name, etc. In such embodiments, management operations, such as disposition sweeps, that need to process and access the document metadata may access the metadata from the metadata database 124.

Figure 4:
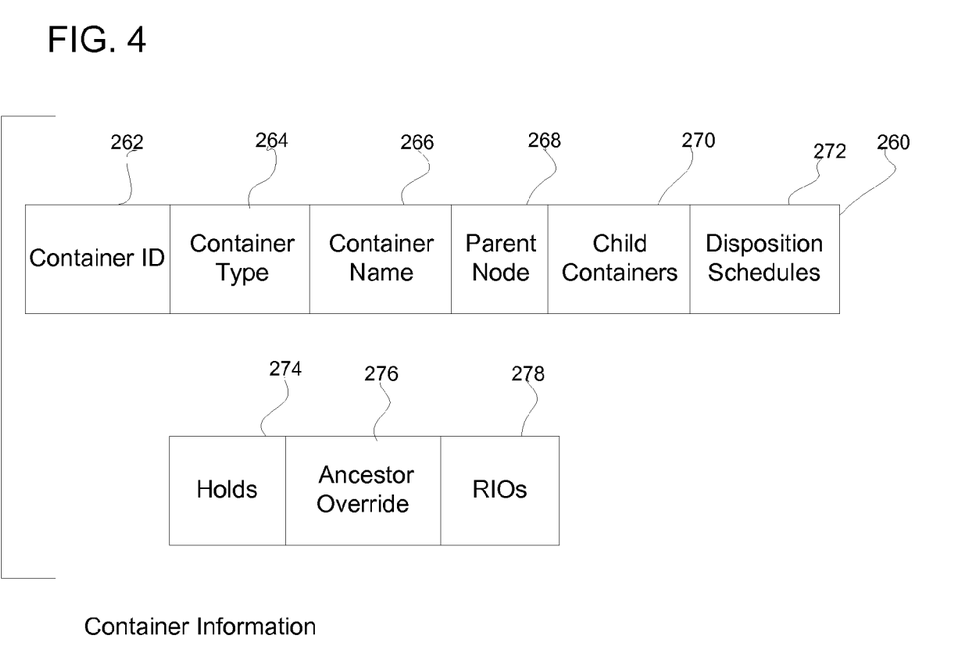
FIG. 4 illustrates an embodiment of information for a container in a file plan.

FIG. 4 illustrates an embodiment of container information 260 maintained for each container generated in a file plan. As discussed a container may comprise a classification scheme, file plan, category, record folder, or other logical subdivision of RIOs. The container information 260 includes:

- container type field 262 indicating whether the container comprises a file plan, category, a sub-category, a record folder, etc.;
- container identifier (ID) 264 indicating a unique ID of the container;
- container name field 266 comprising a name associated with the container node (e.g., "Category1");
- parent node field 268 indicating a direct parent node/container for the container in the file plan hierarchy;
- child containers 270 comprising a list of all children containers (if any) within the container;
- disposition schedules 272 if any, associated with the container, where each disposition schedule may provide a different rule for determining when to dispose (e.g., transfer, review, destroy, archive) of a document represented by an RIO included in the container, either directly or within a container that is a descendant of the container;
- hold rules 274 indicating whether the document should be retained notwithstanding a disposition schedule indicating that the document represented by the RIO within the container should be disposed;
- ancestor override flag 276 indicates whether disposition schedules from containers that are ancestors to the current container including the RIO should be applied to the RIOs within the current container;
- RIOs 278: a list of RIOs included within the container. If the documents are stored in the containers, then the field 278 may include a reference to the document in the container and/or the metadata in a database 124.

In the described embodiments, multiple disposition schedules may be defined for one container and disposition schedules defined for multiple containers may apply to one RIO within one of the containers if the ancestor override flag 276 for the container including the RIO indicates that the disposition schedules of ancestor containers should apply to the RIO. Each disposition schedule may include its own separate set of rules that are potentially applied to each child container and RIO within the scope of the container node in the file plan tree structure. This extensible model for specifying a number of disposition schedules that may apply at different levels in the hierarchy enables additional disposition schedules to be easily added to a node without affecting any previously specified disposition schedules specified for the container node.

Following is an example of disposition schedules A and B, each associated with a separate base event (e.g., PAID and AUDIT). These two disposition schedules/definitions can be associated with a single container node (e.g., Category1 208) in a file plan by referencing the schedules in the disposition schedules field 272. In one embodiment, the specified disposition action is not identified for performance until both events (Paid and Audited) have occurred and a further specified delay period (if any) has expired.

```
Disposition Schedule A:
    Retain until PAID (date) + 1 (year); BUT
        If Amount >100,000, then PAID + 5, OR
        If Amount >1,000,000, then PAID + 10.
Disposition Schedule B:
    Retain until AUDIT (date) + 1 (year).
```

Thus, a disposition schedule may specify requirements based on the document metadata 164 in the RIO (or in the document itself when there are no separate RIOs), such as based on the document type or based on other content of the document. For instance, if the document type is an invoice, then it may not be eligible for disposition unless it has been paid for a certain period of time. If multiple disposition schedules are applicable to an RIO, then all must be satisfied before the document represented by the RIO can be removed. A disposition schedule may specify a rule based on the document metadata, such as the date of creation of the document, size, type and document content. The document content considered by a disposition schedule may be indicated in the document metadata 164 or accessed directly from the document, such as by reading certain fields in the document which may be indicated in the document metadata 164. As discussed document metadata may be maintained in a an RIO or within the document itself. In further embodiments, the sweep process 122 may invoke an external application to process document metadata and/or other information to determine information that may indicate whether a disposition rule is satisfied. Alternatively, the output of the invoked external application may provide input to a disposition schedule rule and be used to determine whether the disposition schedule rule is satisfied.

If a container 262 ancestor override flag 276 indicates that the disposition schedules for ancestor containers apply, then the sweep process 122 applies disposition schedules from ancestor nodes to the RIOs within the container having the ancestor override flag 276 set to indicate to apply ancestor disposition schedules. In one embodiment, when applying disposition schedules from different containers in the hierarchy, the conjunction of the disposition schedules must be satisfied by the document metadata 164 in order for the document to be disposed, i.e., the metadata 164 satisfies the rules of all the disposition schedules. In an alternative embodiment, a document may be disposed if the document metadata satisfies one of multiple disposition schedules, i.e., logical disjunction. If the override flag 276 indicates that ancestor disposition schedules do not apply, then the sweep process 122 only applies the disposition schedules specified for the RIO 168 and for the container directly including the RIO in a conjunctive or disjunctive manner.

In a further embodiment, the document type, which may be indicated in the document metadata 164, may be used to associate a set of documents/RIOs, potentially stored in a variety of categories/subcategories and record folders in the file plan 110, with a particular disposition schedule. The disposition schedule for the record type may override all other disposition schedules. For example, it may be necessary to keep an employee document file for 72 years for accounting/payroll purposes. However, for performance appraisal records such documents need only be retained for 40 years. The disposition schedule for a "type" may be indicated at the RIO level in the disposition schedule 168 field or at some other container level.

Figure 5:
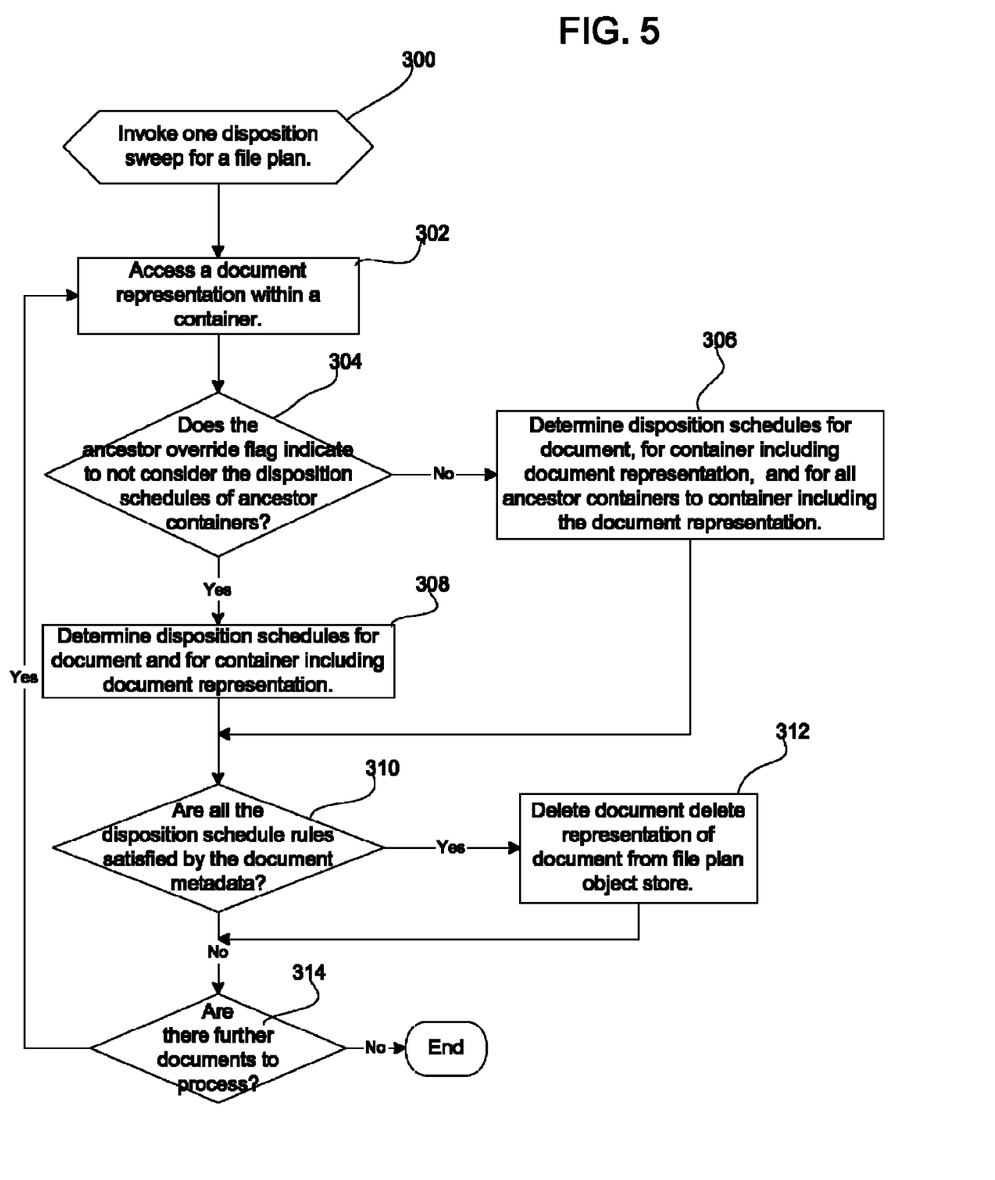
FIG. 5 illustrates an embodiment of operations to apply disposition schedules in a file plan hierarchy to a record information object to determine whether to dispose of the document represented by the record information object.

FIG. 5 illustrates an embodiment of operations performed by a disposition sweep 122 operation invoked to periodically determine whether appropriate disposition schedules apply to a document representation in the file plan. The document representation in the file plan hierarchy may comprise an RIO or a pointer to the document when the document metadata is maintained in the document. Upon invoking (at block 300) a disposition sweep 122 for a file plan 204, 206, the disposition sweep 122 accesses (at block 302) a document representation (e.g., RIO, pointer to document, document itself) within one container, such as a record folder 210. If (at block 304) the ancestor override flag 276 for the container or folder including the accessed document representation indicates that disposition schedules 272 for ancestor containers to the container including the accessed document representation are to apply, then the disposition sweep 122 determines (at block 306) disposition schedules for the document (as indicated in the disposition schedules field 168 (FIG. 2) for the RIO or the document itself), for the container including the document representation (as indicated in the disposition schedules 272 for the container), and for all ancestor containers including the container including the document representation (as indicated in the disposition schedules field 272 of all the ancestor containers. Otherwise, if the ancestor override flag 276 for the container including the accessed document representation indicates to not consider ancestor container disposition schedules, then the disposition sweep 122 determines (at block 308) the disposition schedules for the document representation in the disposition schedules for the document itself (disposition schedules 168 for the RIO (FIG. 2)) and for the container including the document representation in the container disposition schedules 272.

From block 306 or 308, the disposition sweep 122 determines (at block 310) whether all the determined applicable disposition schedules are satisfied by the document metadata. As discussed, the document metadata 164 maybe accessed from the accessed RIO. However, in embodiments where the document metadata is maintained in the document itself and a RIO is not used, then the disposition sweep 122 accesses the document metadata from the document. Yet further, the disposition schedule rule may specify to invoke an external application to process document metadata and/or other information to obtain further information for consideration or determine whether the disposition schedule rule is satisfied. Still further, the disposition schedule rule may process information in the document to determine whether the disposition schedule rule is satisfied. If all determined disposition schedule rules are satisfied, then the disposition sweep 122 disposes (at block 312) of the represented document (which may be the document at the location indicated in the RIO location reference 166), where disposal may involve transfer, review, destroy, archive, etc. The document representation in the file plan hierarchy (e.g., RIO, pointer, etc.) may also be deleted from file plan object store 200. In an embodiment where the RIO is also stored in database or other data store, the RIO may be marked as removed, yet remain in the database.

In the operations at blocks 306 and 308 all possible applicable disposition schedules are considered to determine whether all disposition schedules are satisfied. In an alternative embodiment, the disposition sweep 122 may consider disposition schedules one at a time. If the rules of one disposition schedule are satisfied, then an applicable disposition schedule at a next higher level in the hierarchy is considered. If the rules of one considered disposition schedule are not satisfied, then the document represented by the RIO is not disposed because one disposition schedules is not satisfied. In such case, no further possible applicable disposition schedules at higher levels in the hierarchy are considered if the conjunction of all disposition schedules must be satisfied in order for the RIO to be disposed. Alternatively, satisfaction of the first disposition schedule may result in disposition of the RIO, i.e., a disjunctive consideration of the potential applicable disposition schedules.

With the operations of FIG. 5, disposition schedules from ancestor containers in the file plan hierarchy may apply to a document, such that the document metadata (or document content or information obtained from an invoked external application) must satisfy all the disposition schedules before the document, which may be represented by the RIO is removed. This ensures that a document is not disposed until all disposition requirements are met. For instance, if the litigation department places a longer retention period on a document than the auditing department, then that document is not deleted until the disposition schedule having the longest retention period indicates that the document may be removed. This ensures that the requirements of one disposition schedule are not undermined by another disposition schedule requiring a shorter retention period. Further, with the described embodiments, the administrator may set the ancestor override flag 276 to ensure that only the disposition schedules defined for the RIO and container/folder including the RIO apply. In embodiments where RIOs are not used, the file plan hierarchy and containers may include references to the documents, such that the disposition schedule defined for containers including the document reference applied to determine whether to dispose of the document.

In yet further embodiments, a hold may be defined at a container level in the file plan hierarchy. A hold set at some level in the hierarchy of an RIO, i.e., set for the container including the RIO or an ancestor container to the container including the RIO, may prevent the document represented by the RIO being disposed even if all applicable disposition schedules are satisfied.

Described embodiments provide a framework to allow for multiple disposition schedules to apply to a single document by allowing the setting of multiple disposition schedules at different container levels in a file plan hierarchy. This allows the administrator to modify the overall disposition schedule for a document by setting a disposition schedule at a higher level in the container that may override disposition schedules having different rules or shorter retention periods. Further, the file administrator may prevent higher level disposition schedules from applying to a document by setting the ancestor override flag to ensure that only local disposition schedules, i.e., those set for the document itself (e.g., in the RIO) or for the container including the document reference, apply.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The computer readable medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

In certain embodiments, the file sets and metadata are maintained in separate storage systems and commands to copy the file sets and metadata are transmitted by systems over a network. In an alternative embodiment, the file sets and metadata may be maintained in a same storage system and the command to copy may be initiated by a program in a system that also directly manages the storage devices including the file sets and metadata to copy.

The illustrated operations of FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

FIGS. 2, 3, and 4 provide embodiments of information included in the RIO, file plan, and container. In alternative embodiments, the RIOs, file plan, and containers may include different or additional information.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    providing a file plan including a plurality of containers including a first and second containers, wherein the first and second containers provide management information for documents, and wherein the containers are arranged in a hierarchical relationship, wherein a plurality of containers are arranged in a hierarchy defining containers as descendants and ancestors of each other, and wherein the first container is a descendant of the second container in the hierarchical relationship;
    defining a plurality of disposition schedules for the first and second containers at different levels of the hierarchy, wherein each disposition schedule provides at least one disposition rule to use to determine when to dispose of a document assigned to the first container in the file plan to which the disposition schedule applies, and wherein the rules of the disposition schedules defined for the first and second containers are different;
    determining at least two disposition schedules that apply to one accessed document, wherein a first of the determined disposition schedules is defined in information for the first container in the file plan providing management information for the accessed document and wherein a second of the determined disposition schedules is defined in the information for the second container; and
    applying the determined at least two disposition schedules in the file plan from the first and second containers to document metadata for the accessed document in the file plan assigned to the first container to determine whether to dispose of the accessed document by performing:
        applying at least one disposition schedule from the container to which the document whose document metadata is being considered is assigned; and
        applying at least one disposition schedule from each container having at least one disposition schedule and that is an ancestor to the container to which the document is assigned.

2. The method of claim 1, wherein applying each disposition schedule comprises processing the rules of the disposition schedule and document metadata to determine whether the disposition schedule rules are satisfied, wherein the document whose metadata is processed is disposed of only if all the applied disposition schedules are satisfied.

3. The method of claim 2, wherein document metadata is included within the document or included in a record information object representing the document.

4. The method of claim 1, further comprising:
    defining multiple disposition schedules for one container, wherein applying the at least two disposition schedules comprises applying the multiple disposition schedules defined for one container to the document assigned to the container.

5. The method of claim 1, wherein record information objects represent documents, wherein document metadata for one document is stored in the record information object representing the document, and wherein a document is assigned to one container by including the record information object in the container.

6. The method of claim 1, further comprising, for each document in the file plan:
    setting a flag indicating whether to apply disposition schedules from ancestor containers; and
    applying the at least one disposition schedule defined for the first container to which the document is assigned and not applying the at least one disposition schedule for the second container in response to the flag indicating to not apply disposition schedules from the ancestor containers, and wherein the at least one disposition schedule defined for each container having at least one disposition schedule and that is an ancestor to the container to which the document is assigned, including the second container, is applied in response to the flag indicating to apply disposition schedules from the ancestor containers.

7. The method of claim 1, further comprising:
    defining at least one disposition schedule for one document, wherein applying the at least two of the disposition schedules in the file plan further comprises applying the disposition schedule defined for the document.

8. The method of claim 1, wherein multiple disposition schedules that apply to one record information object provide different disposition schedule rules, wherein the rules of one disposition schedule provide criteria for document metadata comprising at least one of a type of the document and content of the document.

9. The method of claim 1, further comprising:
    invoking an application as part of applying the at least two disposition schedules, wherein output from the invoked application is used to determine whether to dispose of the document.

10. The method of claim 9, wherein the invoked application processes document metadata to produce the output.

11. A system, comprising:
    a processor;
    a file plan including a plurality of containers including a first and second containers, wherein the first and second containers provide management information for documents, and wherein the containers are arranged in a hierarchical relationship, wherein a plurality of containers are arranged in a hierarchy defining containers as descendants and ancestors of each other, and wherein the first container is a descendant of the second container in the hierarchical relationship;

a records manager executed by the processor to perform operations, the operations comprising:

defining a plurality of disposition schedules for the first and second containers at different levels of the hierarchy, wherein each disposition schedule provides at least one disposition rule to use to determine when to dispose of a document assigned to the first container in the file plan to which the disposition schedule applies, and wherein the rules of the disposition schedules defined for the first and second containers are different;

determining at least two disposition schedules that apply to one accessed document, wherein a first of the determined disposition schedules is defined in information for the first container in the file plan providing management information for the accessed document and wherein a second of the determined disposition schedules is defined in the information for the second container; and applying the determined at least two disposition schedules in the file plan from the first and second containers to document metadata for the accessed document in the file plan assigned to the first container to determine whether to dispose of the accessed document by performing:

applying at least one determined disposition schedule from the first container to which the document whose document metadata is being considered is assigned; and applying at least one determined disposition schedule from each container having at least one disposition schedule and that is an ancestor to the container to which the document is assigned, including the second container.

12. The system of claim 11, wherein applying each disposition schedule comprises processing the rules of the disposition schedule and document metadata to determine whether the disposition schedule rules are satisfied, wherein the document whose metadata is processed is disposed of only if all the applied disposition schedules are satisfied.

13. The system of claim 11, wherein the operations further comprise: defining multiple disposition schedules for one container, wherein applying the at least two disposition schedules comprises applying the multiple disposition schedules defined for one container to the document assigned to the container.

14. The system of claim 11, wherein the operations further perform for each document in the file plan:

setting a flag indicating whether to apply disposition schedules from ancestor containers; and applying the at least one disposition schedule defined for the first container to which the document is assigned and not applying the at least one disposition schedule for the second container in response to the flag indicating to not apply disposition schedules from the ancestor containers, and wherein the at least one disposition schedule defined for each container having at least one disposition schedule and that is an ancestor to the container to which the document is assigned, including the second container, is applied in response to the flag indicating to apply disposition schedules from the ancestor containers.

15. The system of claim 11, wherein the operations further comprise:

defining at least one disposition schedule for one document, wherein applying the at least two of the disposition schedules in the file plan further comprises applying the disposition schedule defined for the document.

16. The system of claim 11, further comprising:

invoking an application as part of applying the at least two disposition schedules, wherein output from the invoked application is used to determine whether to dispose of the document.

17. An article of manufacture comprising a computer readable storage medium implementing code for records management operations, wherein the code causes operations to be performed, the operations comprising:

providing a file plan including a plurality of containers including a first and second containers, wherein the first and second containers provide management information for documents, and wherein the containers are arranged in a hierarchical relationship, wherein a plurality of containers are arranged in a hierarchy defining containers as descendants and ancestors of each other, and wherein the first container is a descendant of the second container in the hierarchical relationship;

defining a plurality of disposition schedules for the first and second containers at different levels of the hierarchy, wherein each disposition schedule provides at least one disposition rule to use to determine when to dispose of a document assigned to the first container in the file plan to which the disposition schedule applies, and wherein the rules of the disposition schedules defined for the first and second containers are different;

determining at least two disposition schedules that apply to one accessed document, wherein a first of the determined disposition schedules is defined in information for the first container in the file plan providing management information for the accessed document and wherein a second of the determined disposition schedules is defined in the information for the second container; and applying the determined at least two of the disposition schedules in the file plan from the first and second containers to document metadata for the accessed document in the file plan assigned to the first container to determine whether to dispose of the accessed document by performing:

applying at least one determined disposition schedule from the first container to which the document whose document metadata is being considered is assigned; and applying at least one determined disposition schedule from each container having at least one disposition schedule and that is an ancestor to the container to which the document is assigned, including the second container.

18. The article of manufacture of claim 17, wherein applying each disposition schedule comprises processing the rules of the disposition schedule and document metadata to determine whether the disposition schedule rules are satisfied, wherein the document whose metadata is processed is disposed of only if all the applied disposition schedules are satisfied.

19. The article of manufacture of claim 18, wherein document metadata is included within the document or included in a record information object representing the document.

20. The article of manufacture of claim 17, wherein the operations further comprise:

defining multiple disposition schedules for one container, wherein applying the at least two disposition schedules comprises applying the multiple disposition schedules defined for one container to the document assigned to the container.

21. The article of manufacture of claim 17, wherein record information objects represent documents, wherein document metadata for one document is stored in the record information object representing the document, and wherein a document is assigned to one container by including the record information object in the container.

22. The article of manufacture of claim 17, wherein the operations further comprise, for each document in the file plan:

setting a flag indicating whether to apply disposition schedules from ancestor containers; and applying the at least one disposition schedule defined for the first container to which the document is assigned and not applying the at least one disposition schedule for the second container in response to the flag indicating to not apply disposition schedules from the ancestor containers, and wherein the at least one disposition schedule defined for each container having at least one disposition schedule and that is an ancestor to the container to which the document is assigned, including the second container, is applied in response to the flag indicating to apply disposition schedules from the ancestor containers.

23. The article of manufacture of claim 17, wherein the operations further comprise:

defining at least one disposition schedule for one document, wherein applying the at least two of the disposition schedules in the file plan further comprises applying the disposition schedule defined for the document.

24. The article of manufacture of claim 17, wherein multiple disposition schedules that apply to one record information object provide different disposition schedule rules, wherein the rules of one disposition schedule provide criteria for document metadata comprising at least one of a type of the document and content of the document.

25. The article of manufacture of claim 17, wherein the operations further comprise:

invoking an application as part of applying the at least two disposition schedules, wherein output from the invoked application is used to determine whether to dispose of the document.

26. The article of manufacture of claim 25, wherein the invoked application processes document metadata to produce the output.

* * * * *